(12) United States Patent
Yoon et al.

(10) Patent No.: US 9,629,122 B2
(45) Date of Patent: Apr. 18, 2017

(54) METHOD AND APPARATUS FOR BEAMFORMING IN WIRELESS DEVICE

(71) Applicant: SAMSUNG ELECTRONICS CO., LTD., Suwon-si, Gyeonggi-do (KR)

(72) Inventors: Sung-Rok Yoon, Seoul (KR); Myoung-Hwan Lee, Suwon-si (KR); Jong-Ho Oh, Suwon-si (KR); Sang-Hyun Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/798,870

(22) Filed: Jul. 14, 2015

(65) Prior Publication Data
US 2016/0014722 A1     Jan. 14, 2016

(30) Foreign Application Priority Data
Jul. 14, 2014 (KR) ........................ 10-2014-0088496

(51) Int. Cl.
| | | |
|---|---|---|
| *H04W 4/00* | (2009.01) | |
| *H04W 72/02* | (2009.01) | |
| *H04B 7/06* | (2006.01) | |
| *H04M 1/725* | (2006.01) | |
| *H04W 72/04* | (2009.01) | |
| *H04W 88/06* | (2009.01) | |

(52) U.S. Cl.
CPC .......... *H04W 72/02* (2013.01); *H04B 7/0617* (2013.01); *H04M 1/7253* (2013.01); *H04M 1/72563* (2013.01); *H04W 4/008* (2013.01); *H04M 2250/22* (2013.01); *H04W 72/046* (2013.01); *H04W 72/048* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 7,945,678 | B1* | 5/2011 | Skene | ...................... H04L 45/12 709/227 |
| 2008/0259731 | A1* | 10/2008 | Happonen | .............. G10K 11/34 367/121 |
| 2009/0278743 | A1 | 11/2009 | Wee | |
| 2014/0148107 | A1* | 5/2014 | Maltsev | ................... H04B 1/02 455/91 |
| 2015/0189686 | A1* | 7/2015 | Kasher | .................. H04W 4/008 455/41.2 |

FOREIGN PATENT DOCUMENTS

KR     20090116079     11/2009

OTHER PUBLICATIONS

Maiberger, et al., Location Based Beamforming, IEEE CEEEI, 2010.

* cited by examiner

*Primary Examiner* — Adolf Dsouza
(74) *Attorney, Agent, or Firm* — McAndrews, Held & Malloy, Ltd.

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method for beamforming in a wireless device includes determining a beam based on a user gesture and communicating with another wireless device using the determined beam, and thus the time required to set a beam direction can be reduced and a load for beamforming can be reduced.

20 Claims, 11 Drawing Sheets

<INFORMATION INDICATING THAT ANOTHER DEVICE IS LOCATED ON THE SIDE USED>

METHOD AND APPARATUS FOR BEAMFORMING IN WIRELESS DEVICE

RELATED APPLICATIONS

The present application claims priority under 35 U.S.C. §119 to an application filed in the Korean Intellectual Property Office on Jul. 14, 2014 and assigned Serial No. 10-2014-0088496, the contents of which are incorporated herein by reference.

BACKGROUND

1. Technical Field

Exemplary embodiments of the present disclosure relate to a method and apparatus for beamforming in a wireless device.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, connection between wireless devices starts with searching a neighboring wireless device. The wireless device selects a certain communication channel during a search period, stays in a corresponding channel during a certain time, and then moves to another channel. The wireless device may operate in either one of a search mode and a listen mode while staying in each channel. The wireless device transmits a beacon frame to inform neighboring wireless devices of its existence while operating in the search mode. In addition, the wireless device may receive signals from neighboring wireless devices while operating in the listen mode. For example, if the time during which a first wireless device located in a first channel operates in the search mode and the time during which a second wireless device located in the first channel operates in the listen mode are the same, the first wireless device and the second wireless device may search each other's existence.

When the first wireless device which is in the process of beamforming operates in the search mode, the first wireless device generates beacon signals in different beam directions multiple times. For example, the first wireless device in the search mode may transmit beacon signals while changing beams in all directions in which the first wireless device can transmit, in order to inform wireless devices in all directions, with which the first wireless device can communicate, of its existence. The second wireless device in the listen mode may receive at least one beacon signal from the first wireless device in the search mode, and select a beam direction of a beacon signal having the best signal quality from among the received at least one beacon signal. The second wireless device in the listen mode selects the beam direction that the first wireless device will use, and then carries information on the selected beam direction on a sector sweep signal and forwards the sector sweep signal to the first wireless device. In this case, since the second wireless device does not still determine a beam direction that the second wireless device will use, the second wireless device transmits the sector sweep signal while changing beams in all directions in which the second wireless device can transmit. The first wireless device may receive at least one sector sweep signal from the second wireless device, and may select the beam direction that the first wireless device will use and a beam direction of a sector sweep signal having the best signal quality based on the received sector sweep signal. The first wireless device carries the selected beam direction on a sector sweep signal and forwards the sector sweep signal to the second wireless device. Thereafter, the first wireless device and the second wireless device may exchange each other's information or user data with each other.

In the related-art communication between the wireless devices supporting beamforming, the first wireless device and the second wireless device can search for each other only when the time during which the first wireless device operates in the search mode and the time during which the second wireless device operates in the listen mode overlap each other. Therefore, much time is required for the first wireless device and the second wireless device to search for each other. Furthermore, each of the wireless devices should perform a procedure of transmitting beacon signals and sector sweep signals in all transmission-available beam directions (e.g., at most 128 directions in the 802.11ad standard), and thus there may be a long delay in transmitting and receiving data.

SUMMARY

To address the above-discussed deficiencies, it is a primary object to provide a method and apparatus for reducing the time required to search to communicate between wireless devices.

Another object of the present disclosure is to provide a method and apparatus for reducing the time required to search between wireless devices based on a user gesture.

Another object of the present disclosure is to provide a method and apparatus for reducing the time required to set a beam direction between wireless devices by exchanging information for connecting between wireless devices through Out Of Band (OOB) wireless technology in advance.

Another object of the present disclosure is to provide a method and apparatus for determining a beam direction for communicating between wireless devices by exchanging information related to setting of a beam direction in advance.

Another object of the present disclosure is to provide a method and apparatus for reducing the time required to set a beam direction between wireless devices based on user preference information and antenna arrangement information.

Another object of the present disclosure is to provide a method and apparatus for setting a beam direction for communicating with a counterpart wireless device based on information generated by a user gesture in a wireless device.

According to an aspect of the present disclosure, an operation method of a wireless device includes: determining a beam based on a user gesture; and communicating with another wireless device using the determined beam.

According to another aspect of the present disclosure, an apparatus of a wireless device includes: a controller configured to determine a beam based on a user gesture; and a communication unit configured to communicate with another wireless device using the determined beam.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
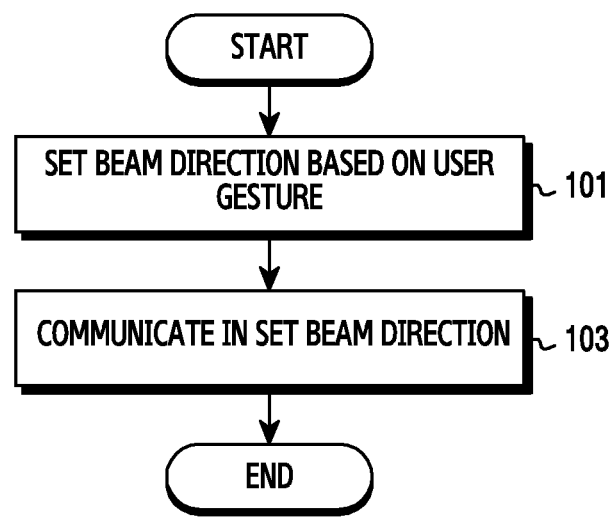
FIG. 1 illustrates a view showing a communication procedure between wireless devices according to an exemplary embodiment of the present disclosure.

Exemplary embodiments of the present disclosure will be described herein below with reference to the accompanying drawings. In the following description, same reference numerals are used for the same elements when they are depicted in different drawings. In addition, in the following description, well-known functions or constructions are not described in detail since they would obscure the invention in unnecessary detail.

In addition, the terms "first," "second," "A,", "B," "(a)," "(b)", etc. may be used in the explanation of the elements. These terms are used only for the purpose of distinguishing one element from another element, and the main feature of a corresponding element is not limited by an order or sequence by those terms. It will be understood that when an element is "connected" or "coupled" to another element, the element may be directly connected or coupled to another element, and there may be an intervening element between the element and another element.

The wireless device set forth in the present disclosure may be fixed or may have mobility, and may be referred to as other terms such as a station, a mobile station (MS), a user equipment (UE), a mobile terminal (MT), a user terminal (UT), a subscriber station (SS), a wireless device, a personal digital assistant (PDA), a wireless modem, a handheld device, or the like. Further, the wireless device may be referred to a search station or a listen station according to an operating mode.

In the following description, a method and apparatus for reducing the time required to set a beam direction between wireless devices will be explained.

Figure 2A:
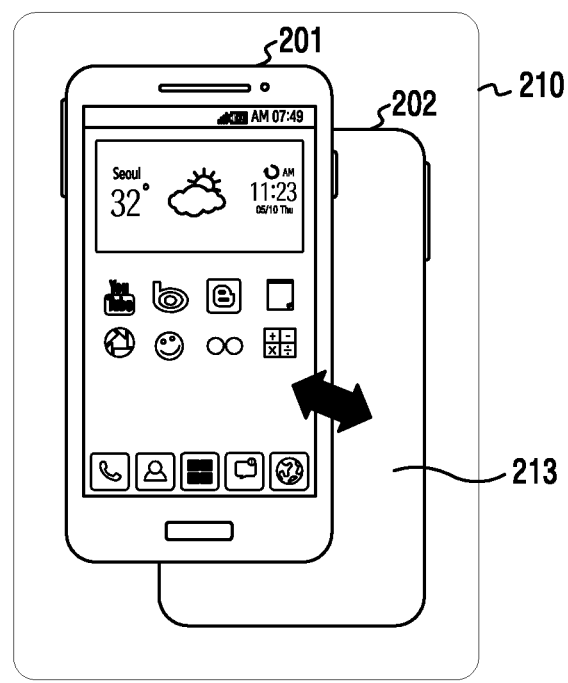
FIGS. 2A to 2C illustrate views showing a beam direction for communicating between wireless devices according to a user gesture according to an exemplary embodiment of the present disclosure.
Figure 2B:
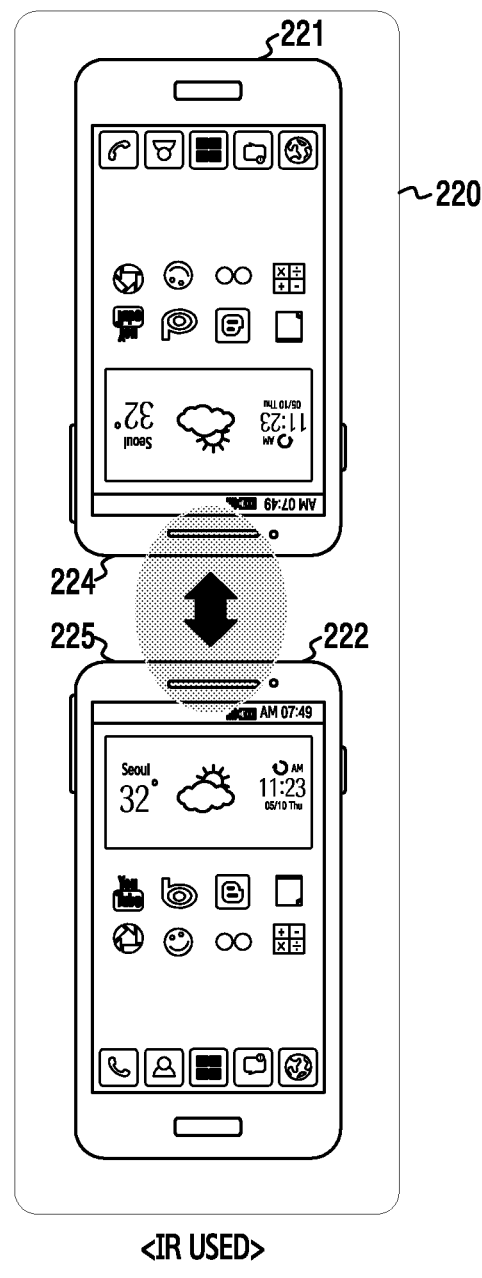
Figure 2C:
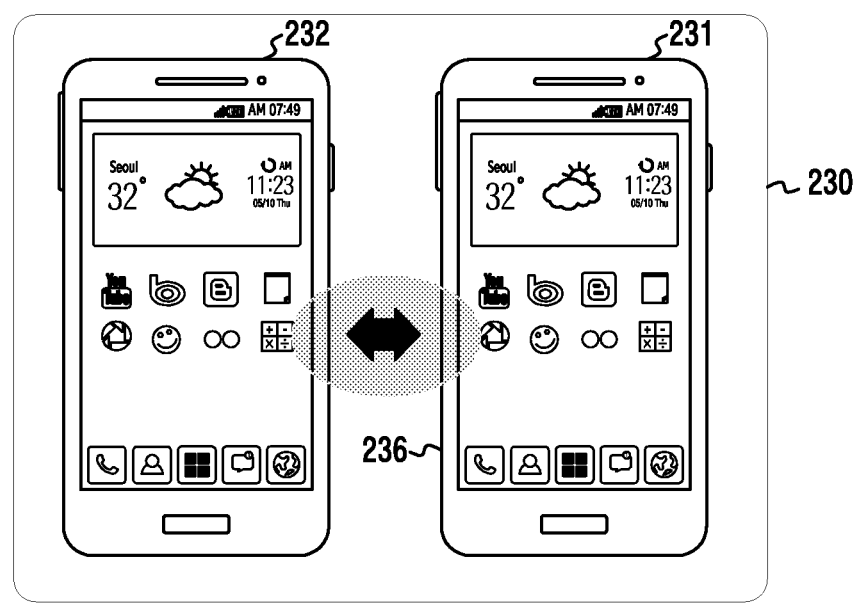

FIG. 1 illustrates a flowchart showing a communication procedure between wireless devices according to an exemplary embodiment of the present disclosure. In addition, FIGS. 2A to 2C illustrate views showing a beam direction for communicating between wireless devices 201, 202 according to a user gesture according to an exemplary embodiment of the present disclosure.

Figure 3A:
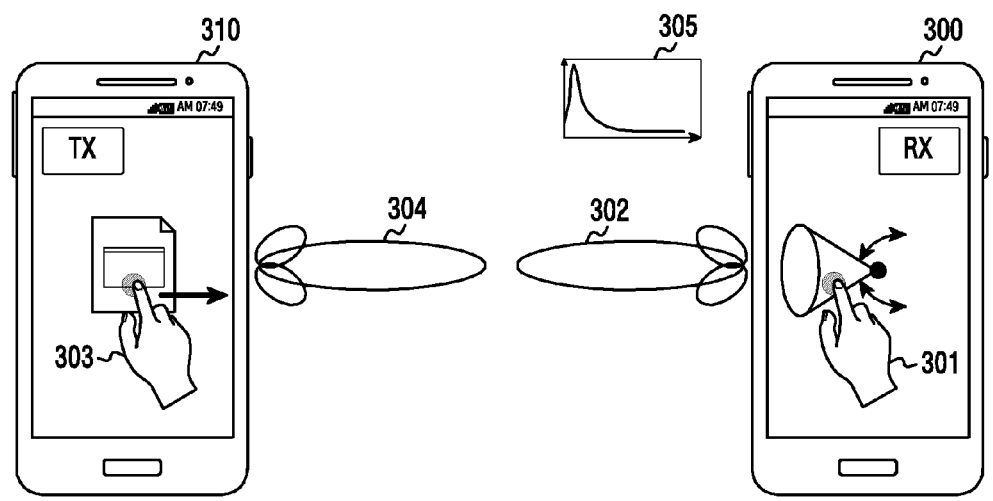
FIGS. 3A and 3B illustrate views showing an example of setting a beam direction for communicating between wireless devices based on a user input according to an exemplary embodiment of the present disclosure.
Figure 3B:
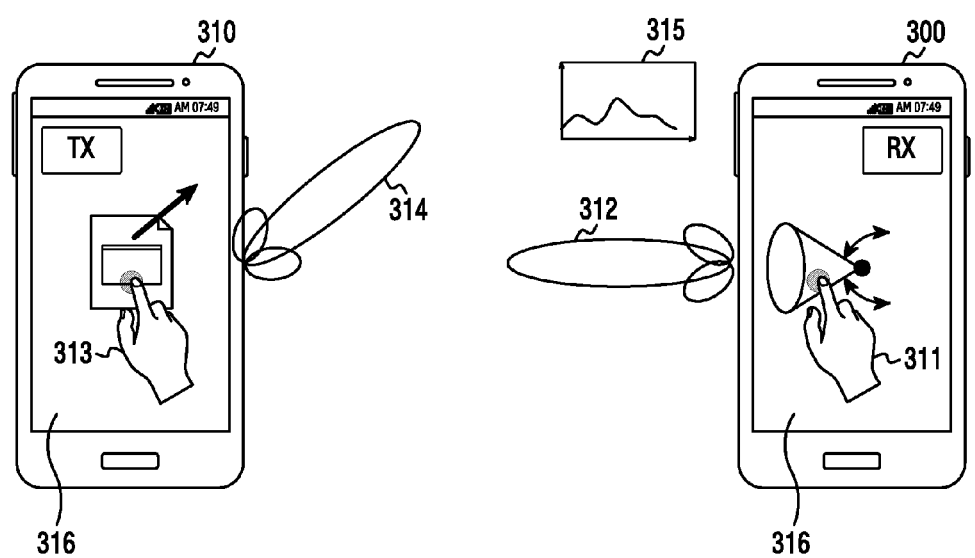

Referring to FIG. 1, a wireless device (e.g., the wireless device 201 of FIG. 2A) sets a beam direction based on a user gesture to communicate with a counterpart or another wireless device (e.g., the wireless device 202 of FIG. 2A) in step 101. For example, the wireless device receives user gesture-related information from another wireless device according to a user gesture through communication technology using OOB, and sets a beam direction based on the user gesture-related information. More specifically, when another wireless device 202 is sensed through a Near Field Communication (NFC) situation 210 as shown in FIG. 2A, the wireless device 201 may sense that the wireless device 201 touches another wireless device 202 back to back based on a user gesture, and set a beam direction of a rear surface 213 as an initial beam direction. In another example, when another wireless device 222 is sensed through an Infrared Ray (IR) situation 220 as shown in FIG. 2B, a wireless device 221 may sense that an upper front surface (or upper side surface) 224 of the wireless device 221 and an upper front surface (or upper side surface) 225 of another wireless device 222 face each other based on a user gesture, and may set a beam direction of the upper front surface (or upper side surface) 224 as an initial beam direction. In another example where a wireless device 231 and another wireless device 232 are in a side-by-side situation 230, as shown in FIG. 2C, the wireless device 231 may sense that another wireless device 232 is located facing a left side surface 236 of the wireless device 231 based on user input information, and set a beam direction of the left side surface 236 as an initial beam direction. More specifically in FIG. 2C, the wireless device 231 may set the initial beam direction based on a direction corresponding to a user input as shown in FIGS. 3A and 3B. FIGS. 3A and 3B will be explained in detail hereinbelow. As described above, a wireless device (e.g., the wireless device 201 of FIG. 2A) may determine in which direction a counterpart wireless device (e.g., the wireless device 202 of FIG. 2A) is located with reference to the wireless device based on a user gesture based on communication technology which has sensed another wireless device, and may determine in which direction the counterpart wireless device is located with reference to the wireless device through a user input. According to an exemplary embodiment, the wireless device may store information on a mapping relationship between respective communication technologies and beam directions in advance. For example, according to an exemplary embodiment, the wireless device may store information indicating that NFC is mapped onto a rear surface beam direction of the wireless device, and an IR is mapped onto an upper front surface beam direction of the wireless device in advance. In exemplary embodiments of the present disclosure, the examples of the OOB are NFC and IR. However, this should not be considered as limiting, and other communication technologies using OOB or other kinds of short-distance wireless communication technology having specific directivity may be used. Furthermore, setting by the wireless device a beam direction based on a user gesture to communicate with another wireless device is not limited to the method of setting a beam direction using OOB or the method of setting a beam direction based on user input information as described above. For example, according to various exemplary embodiments of the present disclosure, a wireless device may set a beam direction by directly exchanging directivity information with another wireless device through 60 GHz. In another example, according to various exemplary embodiments of the present disclosure, a wireless device and a counterpart wireless device may photograph each other using cameras, and set a beam direction corresponding to a direction in which the counterpart wireless device is located.

Referring back to FIG. 1, the wireless device proceeds to step 103 to communicate in the set beam direction. For example, the wireless device may perform a link establishing procedure for the counterpart wireless device through the set beam direction, and perform millimeter wave (mmWave) short-distance wireless communication. For example, the wireless device may optionally skip performing a beam training procedure which transmits beacon signals in all directions that the wireless device can support, and determines a beam direction, and may perform short-distance wireless communication in the 60 GHz band using the beam direction set in step 101.

Thereafter, the wireless device may finish the communication procedure between the wireless devices according to an exemplary embodiment of the present disclosure.

FIGS. 3A and 3B illustrate views showing an example of setting a beam direction for communicating between wireless devices based on a user input according to an exemplary embodiment of the present disclosure.

FIG. 3A illustrates a case in which communication is possible in a beam direction set by a user input, and FIG. 3B illustrates a case in which communication is impossible in a direction set by a user input. Herein, explanations will be provided on the assumption that a first wireless device 300 is a reception device and a second wireless device 310 is a transmission device.

First, referring to FIG. 3A, the first wireless device 300 may sense a data reception graphic image (e.g., an antenna image indicating a data reception direction), which indicates an antenna beam direction, being rotated in the left direction by a user input (301), and set a beam direction (302) to the left direction in which the data reception graphic image is rotated. In addition, the second wireless device 310 may senses a content (e.g., a photo, a moving image, a document, a music file, a text, etc.) being dragged in the right direction by a user input (303), and set a beam direction (304) to the right direction. Thereafter, the second wireless device 310, which is the transmission device, may transmit a probe request signal in the set beam direction (304). The first wireless device 300 receives the probe request from the second wireless device 310, estimates a Channel Impulse Response (CIR) value (305), and determines whether a Line Of Sight (LOS) based on the estimated CIR value (305) exists. If the CIR value (305) indicates that a LOS exists, the first wireless device 300 transmits a probe response signal and performs a link establishing procedure to perform mmWave communication with the second wireless device 310. For example, the first wireless device 300 and the second wireless device 310 set respective beam directions and sense each other's existence based on the user input, so that all operations performed in a general searching process between wireless devices (e.g., searching neighboring wireless devices, setting a beam direction, or the like) may be optional and the mmWave short-distance wireless communication can be performed.

Referring to FIG. 3B, the first wireless device 300 may sense the data reception graphic image, which indicates the antenna beam direction, being rotated in the left direction by a user input (311), and a beam direction (312) to the left direction in which the data reception graphic image is rotated. In addition, the second wireless device 310 may sense the content being dragged to the 2 o'clock position by a user input (313), and set a beam direction (314) to the 2 o'clock position. Thereafter, the second wireless device 310, which is the transmission device, may transmit a probe request signal in the set beam direction (314). The first wireless device 300 receives the probe request from the second wireless device 310, estimates a CIR value (315), and determines whether a LOS based on the estimated CIR exists. If the CIR value indicates that a LOS does not exist, the first wireless device 300 either may transmit a negative-acknowledge character (NACK) or may not transmit a response signal. In this case, at least one of the first wireless device 300 and the second wireless device 310 may output a graphic image indicating a beam direction setting error or requesting resetting of a beam direction on a screen 316. Herein, determining whether a LOS exists by transmitting and receiving probe signals in a beam direction set by a user input is to sense a case in which a beam direction is not exactly set due to user's momentary hand shaking or the like.

In FIGS. 3A and 3B, as an example of setting a beam direction by a user, the beam direction 302, 304, 312, or 314 of the wireless device 300, or 310 may be set through other kinds of user input. For example, the wireless device may directly receive input of direction information (or beam direction information) of the location of a counterpart wireless device from the user in the form of a text, a character, or a number, or may receive input of the direction of the location of the counterpart wireless device through selection of a menu or an icon.

Figure 4:
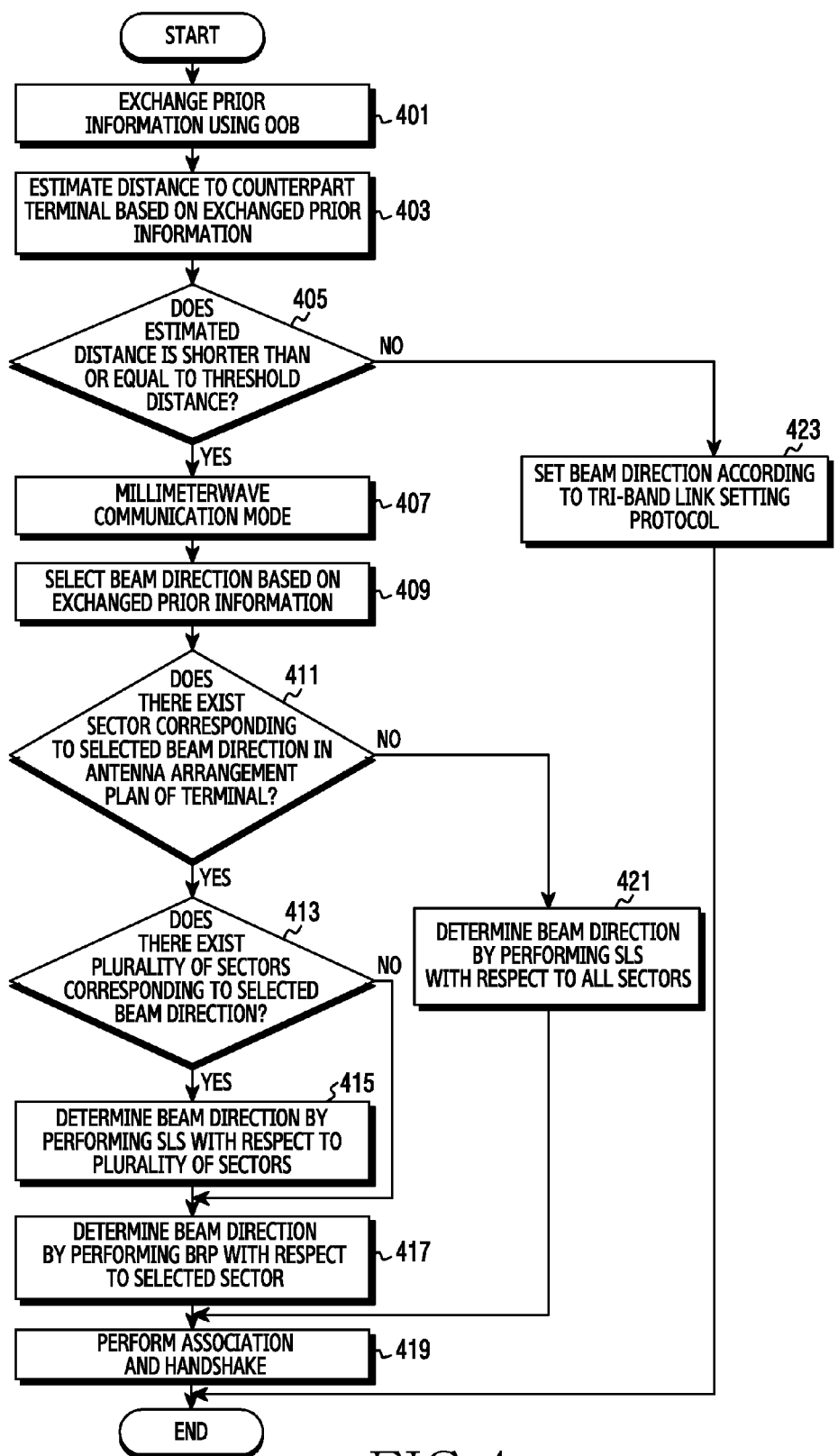
FIG. 4 illustrates a view showing a detailed communication procedure between wireless devices according to an exemplary embodiment of the present disclosure.

FIG. 4 illustrates a view showing a detailed communication procedure between wireless devices according to an exemplary embodiment of the present disclosure.

Referring to FIG. 4, wireless devices (e.g., the wireless devices 300 and 310 of FIG. 3A) exchange prior information for mmWave short-distance wireless communication between the wireless devices with each other using OOB in step 401. The prior information may include at least one of identification information of a wireless device, information indicating proximity of a wireless device to a counterpart wireless device, information indicating whether mmWave short-distance wireless communication is possible, user gesture-related information, information on a communication technology method preferred by a user, information on a communication direction preferred by a user, antenna arrangement information, and encryption key information. For example, if a wireless device (e.g., the wireless device 201 of FIG. 2A) with a NFC function being turned on is close to a counterpart wireless device (e.g., the wireless device 202 of FIG. 2A) with a respective NFC function being turned on within a threshold distance (e.g., within about 1 cm) by a user gesture as exemplarily shown in FIG. 2A, the wireless device may sense the counterpart wireless device being close thereto through NFC, and may exchange the above-described prior information with the counterpart wireless device. In another example, if a wireless device (e.g., the wireless device 221 of FIG. 2B) with an IR function being turned on is located within a threshold distance from a counterpart wireless device (e.g., the wireless device 222 of FIG. 2B) with a respective IR function being turned on by a user gesture as exemplarily shown in FIG. 2B, the wireless device may exchange the above-described prior information with the counterpart wireless device located within the threshold distance through IR. In another example, as exemplarily shown in FIG. 2C, the wireless devices 231 and 232 may exchange prior information including user input information related to a beam direction with each other through short-distance wireless communication technology such as Bluetooth.

Referring back to FIG. 4, the wireless device estimates a distance to the counterpart wireless device based on the prior information exchanged in advance in step 403, and determines whether the estimated distance is shorter than or equal to a threshold distance or not in step 405. For example, the wireless device determines whether the distance to the counterpart wireless device is a distance in which mmWave short-distance wireless communication is possible or not. More specifically, if the wireless device exchanges the prior information with the counterpart wireless device through IR, the wireless device measures a Round Trip Time (RTT) based on signals which are exchanged if the prior information is exchanged with the counterpart wireless device. The wireless device may estimate the distance to the counterpart wireless device based on the measured RTT, and then may determine whether the estimated distance is shorter than or equal to the threshold distance. According to another exemplary embodiment, the wireless device may determine whether the mmWave short-distance wireless communication with the counterpart wireless device is possible or not by comparing the RTT value with a threshold RTT. In another example, if a beam direction is set by the user as shown in FIGS. 2C and 3A and 3B, the wireless device transmits and receives signals using short-distance wireless communication technology such as Bluetooth, and measures the RTT based on the transmitted and received signals. The wireless device may estimate the distance to the counterpart wireless device based on the measured RTT, and then determine whether the estimated distance is shorter than or equal to the threshold distance. Herein, if the prior information is exchanged through NFC, the wireless device may optionally skip the procedures of estimating the distance and determining whether the estimated distance is shorter than or equal to the threshold distance, and may directly proceed to step 407. This is because the NFC communication is possible if the wireless device and the counterpart wireless device are close to each other, and thus, the distance enabling the NFC communication also enables the mmWave short-distance wireless communication between the wireless devices.

If the estimated distance is longer than the threshold distance, the wireless device may determine that the mmWave short-distance wireless communication with the counterpart wireless device is impossible, and may proceed to step 423 to determine a transmission and reception beam for forming a beam direction to the counterpart wireless device according to a tri-band link establishing protocol. For example, the wireless device may communicate with the counterpart wireless device according to a link establishing protocol of a communication method defined by one or more standards. Thereafter, the wireless device finishes the procedure according to the exemplary embodiments of the present disclosure.

On the other hand, if the estimated distance is shorter than or equal to the threshold distance as determined in step 405, the wireless device proceeds to step 407 to convert or switch into an mmWave communication mode, and proceeds to step 409 to select a beam direction based on the exchanged prior information. For example, the wireless device may select, as an initial beam direction, a direction corresponding to the direction in which the counterpart wireless device is located based on the prior information exchanged through OOB in step 401. More specifically, if the wireless device exchanges the prior information with the counterpart wireless device through NFC, the wireless device may select a beam direction corresponding to the rear surface direction which was mapped onto NFC beforehand as the initial beam direction. In another example, if the wireless device exchanges the prior information with the counterpart wireless device through IR, the wireless device may select a beam direction corresponding to an upper front surface (or upper side surface) (e.g., the upper front surface 224 of FIG. 2B) which was mapped onto IR beforehand as the initial beam direction. In another example, if a specific direction is inputted by a user input, the wireless device may select a closest beam direction to the specific direction inputted by the user as the initial beam direction.

Thereafter, the wireless device proceeds to step 411 to check whether a sector corresponding to the selected beam direction in an antenna arrangement plan of the wireless device exists. The antenna arrangement plan may include information on the location, direction, and sector of a beam antenna or an array antenna installed in the wireless device. The sector recited herein may refer to a beam direction of a wider beam width including a plurality of beam directions each having a narrow bean width, and may refer to a beam group including a plurality of beam directions each having a narrow beam width. For example, the wireless device may include beam antennas or array antennas in all directions according to a design method, or may include a beam antenna or an array antenna only in a specific direction. For example, the wireless device may include beam antennas or array antennas in all directions including a rear surface direction, a front surface direction, a left direction, a right direction, a lower side surface direction, and an upper side surface direction. In another example, the wireless device may include beam antennas or array antennas in the upper side surface direction, left direction, and right direction. Therefore, the wireless device may check whether a sector corresponding to the selected initial beam direction (a sector including the initial beam direction) from among the plurality of sectors appearing in the antenna arrangement plan of the wireless device exists.

If a sector corresponding to the selected initial beam direction does not exist, the wireless device proceeds to step 421 to perform Sector Level Sweep (SLS) with respect to all of the sectors appearing in the antenna arrangement plan and determine a beam. The SLS is a protocol for performing link detection in a 802.11ad system, and refers to a beam training method in which wireless devices continuously transmit and receive frames including the same information while changing only the direction of a beam, and select a beam direction having the best index (e.g., Signal-to-Noise Ratio (SNR), Received Signal Strength Indicator (RSSI)) indicating the performance of a reception channel link from the successfully received frames. For example, if the wireless device selects the rear surface direction as the initial beam direction, but an antenna or an array antenna arranged in the rear surface direction does not exist, the wireless device transmits and receives a beacon frame in all beam directions that the wireless device can support in order to find a beam direction enabling communication with the counterpart wireless device. For example, if the counterpart wireless device is located in the rear surface direction of the wireless device, but the wireless device cannot beamform in the rear surface direction, the wireless device transmits and receives beacon frames in all beam directions that the wireless device can support since there may be a beam enabling communication with the wireless device due to reflection or etc, and may determine a beam corresponding to a direction having the best performance index of the channel link, as the transmission and reception beam, based on the result of the transmitting and receiving the beacon frames. Thereafter, the wireless device proceeds to step 419 to perform an association and handshake procedure with the counterpart wireless device based on the beam index corresponding to the determined beam direction, thereby performing mmWave short-distance wireless communication. For example, the wireless device may perform 4-way handshake with the counterpart wireless device to connect the short-distance wireless communication.

Thereafter, the wireless device finishes the procedure according to the exemplary embodiment of the present disclosure.

On the other hand, if the sector corresponding to the selected initial beam direction exists, the wireless device proceeds to step 413 to check whether a plurality of sectors corresponding to the selected beam direction in the antenna arrangement plan exist. For example, if the selected beam direction is the rear surface direction, the wireless device checks whether a plurality of sectors corresponding to the rear surface direction in the antenna arrangement plan exist. In another example, if the direction selected by the user input is the 3 o'clock position, the wireless device may identify a predetermined number of beams adjacent to the beam corresponding to the 3 o'clock position, and may check whether the corresponding beams are included in the plurality of sectors or are included in a single sector.

If the plurality of sectors corresponding to the selected initial beam direction exist, the wireless device proceeds to step 415 to perform partial SLS with respect to the plurality of sectors corresponding to the selected initial beam direction and select a single sector. In step 417, the wireless device determines a beam having a finer beam width by performing Beam Refinement Protocol (BRP) with respect to the selected sector. For example, the wireless device may select a sector having the best performance index of the channel link from among the sectors in the rear surface direction by performing SLS with respect to the plurality of sectors corresponding to the rear surface direction, and may determine a beam corresponding to a direction in which a data transfer rate can be maximized from among the beam directions corresponding to the corresponding sector by performing BRP with respect to the selected sector. Herein, the BRP is a protocol for minutely controlling the beam direction in which the data transfer rate can be maximized in a specific beam direction, and refers to a beam training method in which a beam direction is selected using a BRP frame which is defined for the BRP and includes beam training information and information reporting the result of training. For example, the BRP refers to a beam training method, which transmits and receives a BRP frame using a beam determined by SLS or other means, and substantially performs beam training using a beam training sequence included in a tail of the BRP frame successfully transmitted and received. The BRP differs from the SLS in that the SLS uses a frame itself for the beam training, whereas the BRP uses only the beam training sequence. In the above-described exemplary embodiment, if the plurality of sectors corresponding the selected initial beam direction exist, a single selector is selected by performing the SLS on a sector basis, and a beam having a narrower beam width than that of the sector and having a direction that can maximize the transfer rate is determined by performing the BRP with respect to the selected sector. However, according to a design method, a beam having the best channel link performance index may be determined by performing the SLS on the basis of a beam width, which is narrower than the sector, and thus the BRP may be optionally omitted. However, in order to save the time required to perform the beam training, performing the SLS on the basis of the sector and performing the BRP is more efficient than performing the SLS on the basis of the narrow beam width. According to another exemplary embodiment, if a single sector corresponding to the selected beam direction exists and the beam width corresponding to the sector is narrow, both the SLS and the BRP may be optionally omitted. Thereafter, the wireless device proceeds to step 419 to perform the association and handshake procedure with the counterpart wireless device based on the beam index corresponding to the determined beam direction, thereby performing mmWave short-distance wireless communication. Thereafter, the wireless device finishes the procedure according to the exemplary embodiment of the present disclosure.

On the other hand, if a single sector corresponding to the selected initial beam direction exists, the wireless device determines a finer beam direction by performing the BRP with respect to the single sector corresponding to the selected initial beam direction in step 417. For example, the wireless device may determine a transmission and reception beam having a narrower beam width in the rear surface direction by performing the BRP with respect to a specific sector corresponding to the rear surface direction. Thereafter, the wireless device proceeds to step 419 to perform the association and handshake procedure with the counterpart wireless device based on the beam index corresponding to the determined beam direction, thereby performing mmWave short-distance wireless communication. Thereafter, the wireless device finishes the procedure according to the exemplary embodiment of the present disclosure.

In FIG. 4 described above, if the initial beam direction set based on the exchanged prior information is less than acceptable, SLS and/or BRP corresponding to the initial beam direction are performed. However, if the initial beam set based on the exchanged prior information is acceptable, the SLS and BRP may not be performed.

In FIG. 4 described above, the wireless device selects the beam direction by exchanging the prior information with the counterpart wireless device through the OOB. However, according to various exemplary embodiments of the present disclosure, the wireless device may select a beam direction based on a user input, select a beam direction by directly exchanging directivity information through 60 GHz, or select a beam direction corresponding to a direction in which the counterpart wireless device is located by photographing the counterpart wireless device through a camera.

Figure 5:
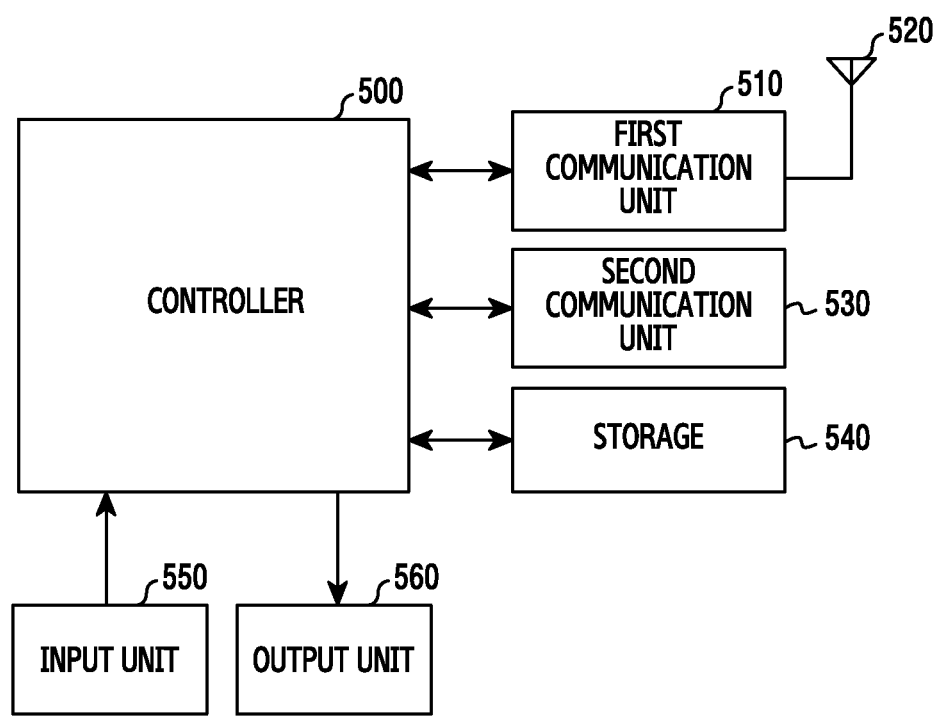
FIG. 5 illustrates a block diagram showing a configuration of a wireless device according to an exemplary embodiment.

FIG. 5 illustrates a block diagram showing a configuration of a wireless device (e.g., the wireless device 201 of FIG. 2A) according to an exemplary embodiment of the present disclosure.

Referring to FIG. 5, the wireless device may include a controller 500, a first communication unit 510, an antenna 520, a second communication unit 530, a storage 540, an input unit 550, and an output unit 560.

The controller 500 performs a control function for overall operations of the wireless device. The controller 500 may be embodied by at least one processor. According to an exemplary embodiment of the present disclosure, the controller 500 controls and processes a function for setting an initial beam direction for communicating with another wireless device based on a user gesture. For example, the controller 500 may set the beam direction based on information which is generated or inputted by a user gesture or exchanged with another wireless device by a user gesture through communication technology using OOB. For example, if the wireless device touches another wireless device back to back by a user gesture as shown in FIG. 2A, the controller 500 may set the rear surface direction as the initial beam direction by exchanging prior information with another wireless device through NFC. In another example, if the upper front surface (or upper side surface) of the wireless device and the upper front surface (or upper side surface) of another wireless device face each other by a user gesture, the controller 500 may exchange prior information with another wireless device through IR, and may set the upper front surface (or upper side surface) direction as the initial beam direction. In another example, as shown in FIG. 2C, the controller 500 may sense that another wireless device is located facing the left side surface of the wireless device based on user input information, identify an LOS by exchanging signals with another wireless device, and then set the beam direction of the left side surface as the initial beam direction.

If the set initial beam direction corresponds to a fine beam, the controller 500 may determine a transmission and reception beam based on the initial beam direction. However, if the set initial beam direction does not correspond to a fine beam and corresponds to a wider beam (e.g., a sector), the controller 500 may determine the transmission and reception beam by performing SLS and/or BRP based on the initial beam direction. That is, the controller 500 sets the initial beam direction and then determines whether a sector corresponding to the initial beam direction based on antenna arrangement information exists. If a sector corresponding to the initial beam direction does not exist, the controller 500 controls the function of determining the transmission and reception beam for communicating with another wireless device by performing the SLS with respect all beam directions that the wireless device can support. If a sector corresponding to the initial beam direction exists, the controller 500 may control the function for determining the transmission and reception beam for communicating with another wireless device by performing only the BRP or by performing the SLS and then performing the BRP according to the number of corresponding sectors. For example, if a single sector corresponding to the initial beam direction exists, the controller 500 may determine the transmission and reception beam by performing the BRP with respect to the single sector. On the other hand, if a plurality of sectors corresponding to the initial beam direction exist, a single sector may be selected by performing the SLS on the basis of a sector, and then the transmission and reception beam may be determined by performing the BRP with respect to the selected sector. In another example, if a plurality of sectors corresponding to the initial beam direction exist, the transmission and reception beam may be determined by performing the SLS on the basis of a beam without performing the BRP.

The first communication unit 510 performs a function for exchanging signals with another wireless device via the antenna 520. The first communication unit 510 may comprise at least one transceiver. For example, the first communication unit 510 beamforms in a specific direction through the antenna 520 and performs the function for performing mmWave short-distance wireless communication of 60 GHz. The first communication unit 510 may include a plurality of encoders, a plurality of modulators, a plurality of sub-carrier mapper, and a plurality of RF transmitters, although they are not shown. The first communication unit 510 may form a transmission and reception beam in a specific direction under the control of the controller 500 using at least one of digital beamforming, beamforming for physically moving an antenna, at least one antenna corresponding to a pre-defined beam direction, and bundles of antennas or array antennas.

The second communication unit 530 performs a function of exchanging signals with another wireless device through OOB. For example, the second communication unit 530 may exchange signals with another wireless device through NFC, IR, or Bluetooth. According to an exemplary embodiment, the second communication unit 530 may exchange prior information with another wireless device in order for the first communication unit 510 to set a beam in a specific direction under the control of the controller 500.

The storage 540 stores various data and programs necessary for the operations of the wireless device. For example, the storage 540 may store information on a mapping relationship between each communication technology and a beam direction in advance, and store antenna arrangement information of the wireless device.

The input unit 550 receives input of information by a user gesture, and provides the input information to the controller 500. For example, the input unit 550 may include at least one of at least one physical key button (not shown), a touch sensor (not shown), a touch pad (not shown), a keypad (not shown), and a microphone (not shown). The input unit 550 may receive input of information on a beam direction for mmWave short-distance wireless communication with another wireless device from the user.

The output unit 560 outputs graphic data and/or voice data which is generated during the operation of the wireless device. For example, the output unit 560 may include a display device such as a touch screen (e.g., the screen 316 of FIG. 3B) or a speaker (not shown). The output unit 560 may provide a graphic interface for requesting a user to set a beam direction for mmWave short-distance wireless communication with another wireless device.

Figure 6A:
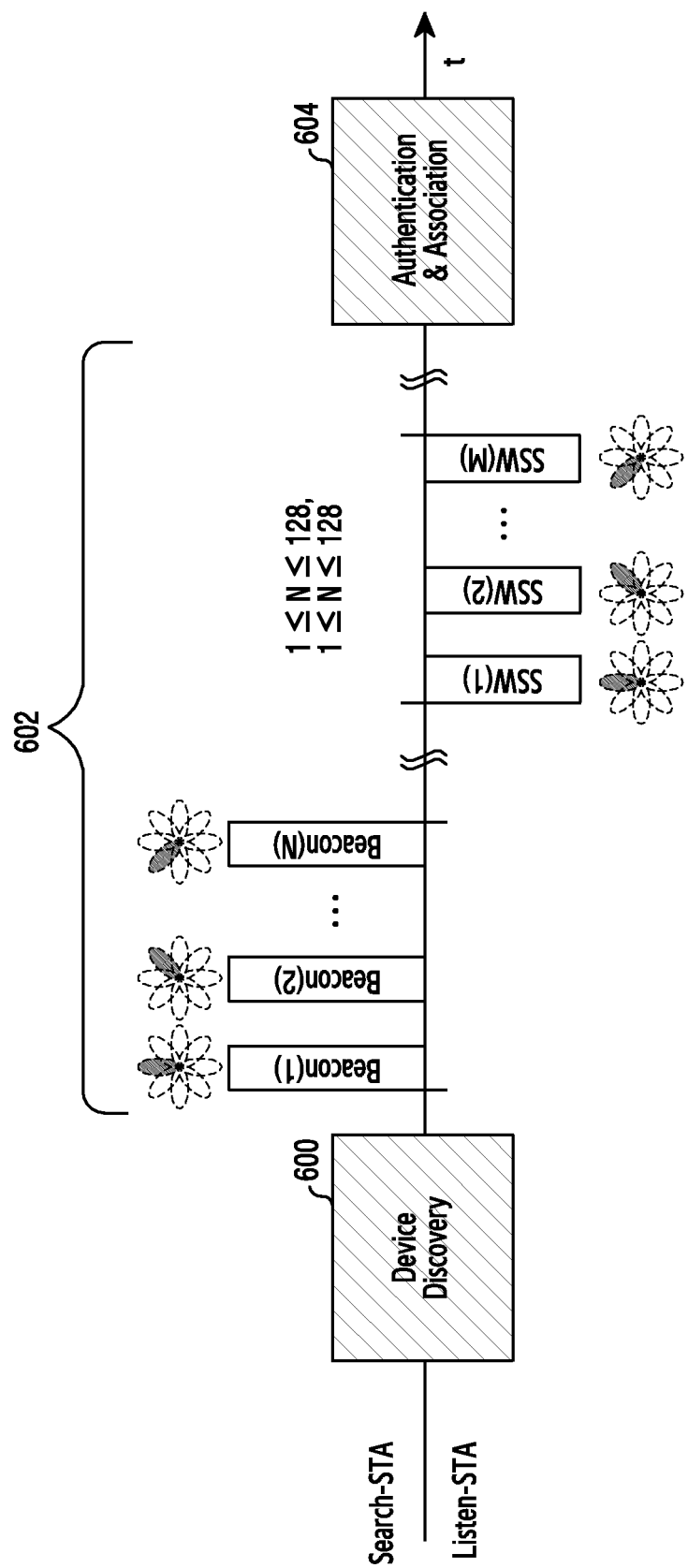
FIGS. 6A to 6C illustrate views showing the time required to set a beam direction between wireless devices according to the prior art and an exemplary embodiment of the present disclosure.
Figure 6B:
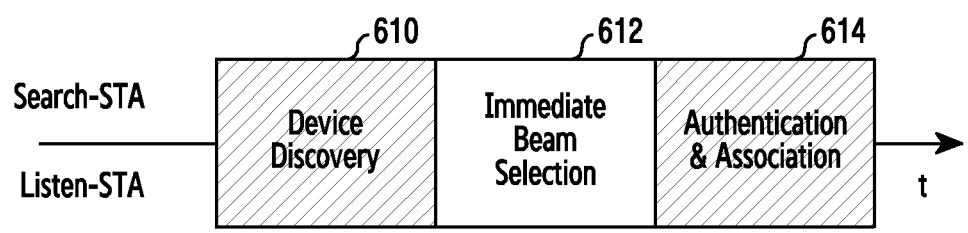
Figure 6C:
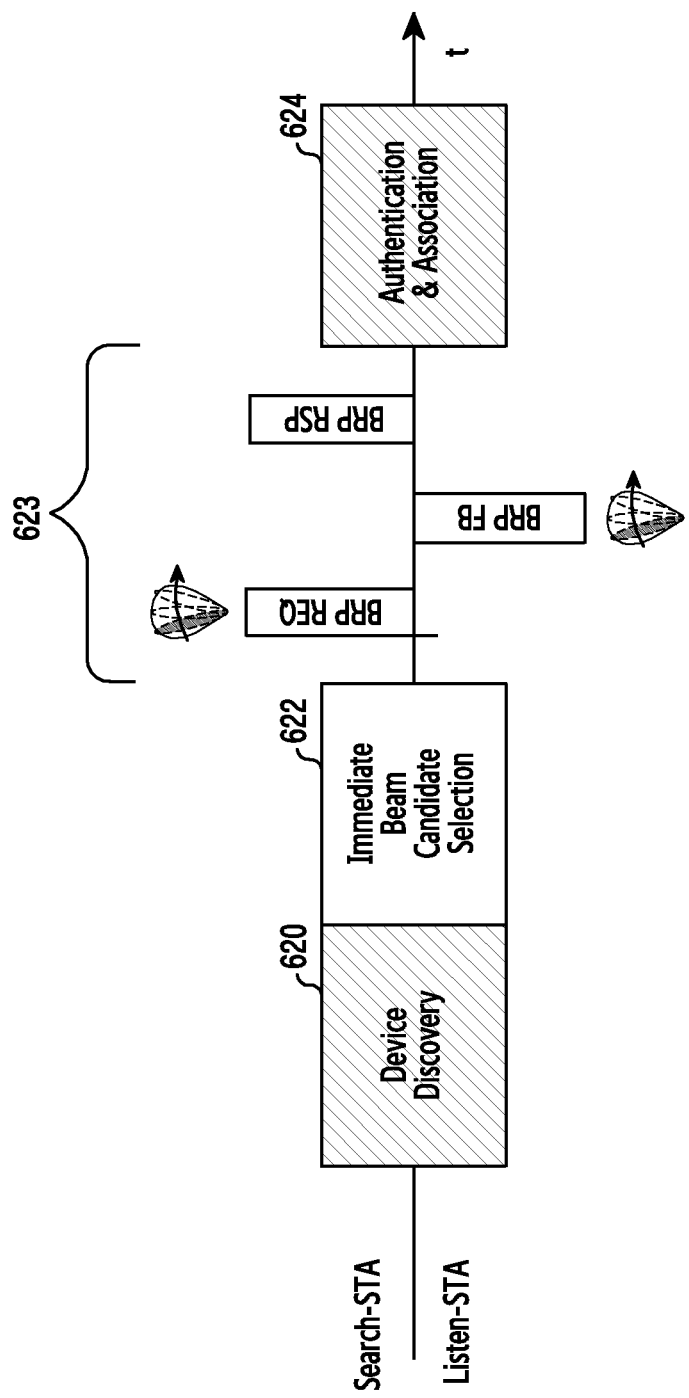

FIGS. 6A to 6C illustrate views showing a time required to set a beam direction between wireless devices (e.g., the wireless devices 201, 202, of FIG. 2A) according to the prior art and an exemplary embodiment of the present disclosure.

FIG. 6A illustrates a view showing a time required to set a beam direction between wireless devices according to the prior art. FIG. 6B illustrates a view showing a time required to determine a transmission and reception beam in an initial beam direction immediately according to an exemplary embodiment of the present disclosure, and FIG. 6C illustrates a view showing the time required to determine a transmission and reception beam by performing BRP in an initial beam direction according to another exemplary embodiment of the present disclosure.

As shown in FIG. 6A, the wireless device according to the prior art discovers a counterpart wireless device (600), transmits beacon signals through 128 supportable beams (602), receives signals from the counterpart wireless device through the 128 supportable beams (602), and then performs authentication and association processes (604). That is, the wireless device should change the transmission beam 128 times and change the reception beam 128 times, and thus there may be a long delay.

On the other hand, as shown in FIG. 6B, the wireless device according to an exemplary embodiment of the present disclosure discovers a counterpart wireless device (610), selects an initial beam direction based on a user gesture, determines a transmission and reception beam based on the selected initial beam direction immediately (612), and performs authentication and association processes (614), and thus skips 256 beam changing operations in total.

In addition, as shown in FIG. 6C, the wireless device according to another exemplary embodiment of the present disclosure discovers (620) a counterpart wireless device, selects (622) an initial beam direction based on a user gesture, performs (623) BRP with respect to a sector corresponding to the selected initial beam direction, and performs (624) authentication and association processes, and thus skips performing 256 beam changing operations and changes beams as many times as the number of beams included in the sector corresponding to the initial beam direction. For example, according to another exemplary embodiment of the present disclosure, there is an effect of reducing the time required for the wireless device to perform a beam training for determining a transmission and reception beam.

The present disclosure can achieve the effects of reducing a time required to set a beam direction and reducing a load for beamforming by exchanging user gesture information through OOB wireless technology, and setting an initial beam direction for mmWave communication between the wireless devices based on the exchanged user gesture information.

While the present disclosure has been particularly shown and described with reference to exemplary embodiments thereof, it will be understood by those skilled in the art that various changes in form and details may be made therein without departing from the spirit and scope of the present invention as defined by the appended claims.

The operations according to the exemplary embodiments of the present disclosure may be implemented by a single controller. In this case, program commands for performing operations implemented by various computers may be recorded on a computer-readable recording medium. The computer-readable recording medium may include program commands, data files, and data structures either alone or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. If all or some of a base station or a relay described in the present disclosure is implemented by a computer program, a computer-readable recording medium storing the computer program is also included in the present disclosure. Therefore, the scope of the invention is defined not by the detailed description of the invention but by the appended claims, and all differences within the scope will be construed as being included in the present invention.

What is claimed is:

1. A method for operating an electronic device, comprising:
   receiving from another electronic device, by using a first radio access technology (RAT), information regarding a second RAT;
   if a value for a distance between the electronic device and the another electronic device is equal to or less than a threshold value, identifying a direction to the another electronic device based on at least one of information regarding the first RAT and a user input regarding the second RAT;
   determining a beam for the second RAT based on the information regarding the second RAT and the direction; and
   transmitting to the another electronic device a signal through the beam by using the second RAT.

2. The method of claim 1,
   wherein the user input comprises at least one of a text input indicating a direction to the another electronic device, a selection of an item indicating the direction to the another electronic device, and a swipe input indicating the direction to the another electronic device.

3. The method of claim 2, further comprising:
   determining whether a line of sight (LOS) exists by transmitting and receiving signals based on the beam;
   if the LOS exists, determining the beam as a final beam; and
   if the LOS does not exist, requesting from a user another input related to another beam.

4. The method of claim 1, wherein the information regarding the first RAT comprises mapping information between the direction and the first RAT.

5. The method of claim 4, wherein the determining the beam for the second RAT comprises:
   determining whether a sector corresponding to the direction exists on antenna arrangement information of the electronic device; and
   if the sector corresponding to the direction exists, determining the beam by performing a beam training procedure within the sector.

6. The method of claim 5, wherein determining the beam by performing the beam training procedure within the sector comprises:
   if a single sector corresponding to the direction exists, determining the beam by performing a beam refinement within the single sector.

7. The method of claim 5, wherein determining the beam by performing the beam training procedure within the sector comprises:
   if a plurality of sectors corresponding to the direction exists, selecting a single sector by performing sector level sweep (SLS) regarding the plurality of sectors; and
   determining the beam by performing a beam refinement within the single sector.

8. The method of claim 4, wherein the determining the beam for the second RAT comprises:
   determining whether a sector corresponding to the direction exists on antenna arrangement information of the electronic device; and
   if the sector does not exist, determining the beam by performing a beam training procedure for all beams.

9. The method of claim 1, wherein the information regarding the second RAT comprises at least one of identification information of the electronic device, information indicating proximity of the electronic device to the another electronic device, information indicating whether mmWave short-distance wireless communication is possible, user gesture-related information, information on a communication technology method preferred by a user, information on a communication direction preferred by a user, antenna arrangement information, and encryption key information.

10. The method of claim 1, wherein the information regarding the first RAT comprises a location of a hardware component for the first RAT.

11. An electronic device, comprising:
a transceiver configured to receive from another electronic device, by using a first radio access technology (RAT), information regarding a second RAT; and
a controller configured to:
if a value for a distance between the electronic device and the another electronic device is equal to or less than a threshold value, identify a direction to the another electronic device based on at least one of information regarding the first RAT and a user input regarding the second RAT; and
determine a beam for the second RAT based on the information regarding the second RAT and the direction,
wherein the transceiver is further configured to transmit to the another electronic device a signal through the beam by using the second RAT.

12. The electronic device of claim 11, wherein the user input comprises at least one of a text input indicating a direction to the another electronic device, a selection of an item indicating the direction to the another electronic device, and a swipe input indicating the direction to the another electronic device.

13. The electronic device of claim 12, wherein the controller is configured to:
determine whether a line of sight (LOS) exists by transmitting and receiving signals based on the beam;
if the LOS exists, determine the beam as a final beam; and
if the LOS does not exist, request from a user another input information related to another beam.

14. The electronic device of claim 11, wherein information regarding the first RAT comprises mapping information between the direction and the first RAT.

15. The electronic device of claim 14, wherein the controller is configured to:
determine whether a sector corresponding to the direction exists on antenna arrangement information of the electronic device; and
if the sector corresponding to the direction exists, determine the beam by performing a beam training procedure within the sector.

16. The electronic device of claim 15, wherein the controller is configured to, if a single sector corresponding to the direction exists, determine the beam by performing a beam refinement within the single sector.

17. The electronic device of claim 15, wherein the controller is configured to:
if a plurality of sectors corresponding to the direction exist, select a single sector by performing sector level sweep (SLS) regarding the plurality of sectors; and
determine the beam by performing a beam refinement within the single sector.

18. The electronic device of claim 14, wherein the controller is configured to:
determine whether a sector corresponding to the direction exists on antenna arrangement information of the electronic device; and
if the sector does not exist, determine the beam by performing a beam training procedure for all beams.

19. The electronic device of claim 11, wherein the information regarding the second RAT comprises at least one of identification information of the electronic device, information indicating proximity of the electronic device to the another electronic device, information indicating whether mmWave short-distance wireless communication is possible, user gesture-related information, information on a communication technology method preferred by a user, information on a communication direction preferred by a user, antenna arrangement information, and encryption key information.

20. The electronic device of claim 11, wherein the information regarding the first RAT comprises a location of a hardware component for the first RAT.

* * * * *